United States Patent [19]

Wolters et al.

[11] Patent Number: 4,766,422
[45] Date of Patent: Aug. 23, 1988

[54] COMPUTER INTEGRATED DESK

[75] Inventors: Richard H. Wolters, Grand Rapids Twp., Mich.; Vince Kleyla, Phoenix, Ariz.; Arnold J. Hooton, Caledonia Twp.; Gregory L. Converse, Wyoming, both of Mich.

[73] Assignee: Westinghouse Electric Corp., Pittsburgh, Pa.

[21] Appl. No.: 866,514

[22] Filed: May 23, 1986

[51] Int. Cl.$^4$ .............................................. G09G 3/00
[52] U.S. Cl. ................................... 340/700; 312/194; 312/198; 312/208; 358/254; 248/1 A; 248/1 B
[58] Field of Search ........... 340/700, 711, 720, 365 R; 312/208, 294, 298, 299, 304, 306, 350, 194, 198, 199, 201; 108/14, 38, 86, 147; 248/1 A, 1 B, 1 C; 358/248, 254, 249, 255

[56] References Cited

U.S. PATENT DOCUMENTS

| D. 266,467 | 10/1982 | Ylanko | D6/188 |
|---|---|---|---|
| 2,890,010 | 6/1959 | Barkheimer | 248/1 C |
| 3,778,125 | 12/1973 | Gutmann, Jr. et al. | 312/208 |
| 4,145,097 | 3/1979 | Naess et al. | 312/208 |
| 4,345,803 | 8/1982 | Heck | 312/194 |
| 4,449,762 | 5/1984 | Turner | 312/196 |
| 4,458,961 | 7/1984 | Browning | 248/1 B |
| 4,515,086 | 5/1985 | Kwiecinski et al. | 108/96 |
| 4,546,708 | 10/1985 | Wilburth | 108/94 |
| 4,562,482 | 12/1985 | Brown | 248/1 A |
| 4,636,781 | 1/1987 | Wills et al. | 340/700 |
| 4,669,789 | 6/1987 | Pemberton | 312/208 |
| 4,695,104 | 9/1987 | Lederman | 312/208 |

FOREIGN PATENT DOCUMENTS

| 2846786 | 4/1980 | Fed. Rep. of Germany | 340/700 |
|---|---|---|---|
| 2847135 | 5/1980 | Fed. Rep. of Germany | 340/700 |
| 3037679 | 5/1982 | Fed. Rep. of Germany | 248/1 B |
| 0866494 | 4/1961 | United Kingdom | 358/249 |

OTHER PUBLICATIONS

Sales Article by "Biofec Systems", 10-15-1984.

Primary Examiner—Gerald L. Brigance
Assistant Examiner—Jeffery A. Brier
Attorney, Agent, or Firm—B. R. Studebaker

[57] ABSTRACT

A computer integrated desk having the VDT (visual display terminal), keyboard, disc drives and printer completely concealed within the desk when not in use and quickly convertible to a fully operable computer work station by exposing a keyboard at a central location, raising a flat screen VDT from beneath the work surface and accessing the disc drives and printer by opening a door.

4 Claims, 6 Drawing Sheets

COMPUTER INTEGRATED DESK

BACKGROUND OF THE INVENTION

This invention relates to computer work stations or desks and more particularly to a computer integrated desk or work station in which all of the computer elements are completely concealed and integrated into the desk but are readily accessible for use.

There has been a tremendous influx of small business computers into the office of today. The appearance of a work station has greatly changed over the past few years with the typical office or work station desk work surface being continuously covered by computer keyboards, visual display terminals, disc drives and printers which utilize most or all of the space available for other types of work. This, other than from an appearance standpoint, has not been very critical with respect to a work station or desk at which the computer system is utilized for a substantial portion of the day. However, computers are now being used extensively by executives and managers on a casual but daily basis to quickly access important business information such as engineering data, marketing and sales information, production information as well as electronic mail. Typically, prior to this invention, the executive's or manager's desk has taken on the appearance of a computer work station. Many executives and managers object to their work surface or desk continuously supporting these many and varied electronic devices when their need to access the computer is both minimal and sporadic during a typical workday.

With the advent of the small business computer in the office, there have been a number of efforts to specifically design a work station or desk to accommodate the computer peripherals. For example, U.S. Pat. No. Des. 266,467 for "Combined Desk and Auxiliary Shelf for Data Terminal" discloses a work surface with a recess therein for receiving a keyboard and a height adjustable support for a VDT.

U.S. Pat. No. 4,345,803 for "Work Station Desk" discloses an angular desk for an office machine having a recessed area for a keyboard and a slot in the upper surface for handling computer paper.

U.S. Pat. No. 4,515,086 for "Adjustable Word Processor Work Station" includes a work surface having a recessed height adjustable keyboard support in the front and a console mounting rear platform which is height adjustable and tiltable.

U.S. Pat. No. 4,449,762 for "Computer Desk" discloses a computer desk which provides a work surface immediately below the work surface of the desk top in order to provide additional desk top work surface and also support for the keyboard, disc drives, printer and VDT.

U.S. Pat. No. 4,458,961 for "Computer Terminal Work Station" discloses a work station comprising a selected grouping of modular drawer, file and shelf units for housing a variety of computer related peripherals such as a printer, VDT, and keyboard. The desk employs different support levels for the various peripherals.

As will be apparent, none of the prior art computer work stations solve the problem of providing an essentially computer element or peripheral free work environment for the executive or manager while performing his normal functions of holding meetings, conferences and writing, yet provide quick access to computer technology for those comparatively infrequent times when they are needed.

SUMMARY OF THE INVENTION

Although it is important to provide an executive or manager with a comparatively litter-free desk, it is also essential that the computer integrated desk provide him or her with quick and convenient access to the computer system when it is needed. The computer integrated desk of this invention accommodates this relatively quick access by providing a computer work station or desk comprising in combination a work surface having an opening therethrough adjacent the front edge thereof. Storage means connected to the underside of the work surface adjacent at least one side thereof and a desk pad covering the opening in the work surface with a keyboard tray mounted within the opening beneath the desk pad. Means are included cooperating with the desk pad to raise the keyboard tray to an operating position within the opening when the desk pad is moved from a first position overlying the opening to a second position rearward of the opening. A flat VDT screen is mounted to the rear of the work surface for relative movement therewith, and means associated with the VDT screen move the VDT screen from a position beneath the work surface to a viewable position above the work surface. The storage means of the computer-integrated desk includes a rear wall and side walls and a door closing off the front with the side walls supporting movable shelves therein and the door being preferably a tambour door for enclosing a computer, disc drives and printer within the storage means.

The computer-integrated desk of this invention is quickly and easily converted from a conventional appearing office desk to a computer work station by merely moving forward the desk pad to permit the computer keyboard to rise up in the central front portion of the work surface, the desk pad then forming an easel. By opening the pedestal door, pressing a button to activate the electronics and a second button to raise the lift mounted flat VDT screen from a stored position beneath the work surface to a visible position at the rear of the work surface, the conversion is completed.

BRIEF DESCRIPTION OF THE DRAWINGS

Many of the attendant advantages of the present invention will become more readily apparent and better understood as the following detailed description is considered in connection with the accompanying drawings in which.

DESCRIPTION OF THE PREFERRED EMBODIMENT

Figure 1:
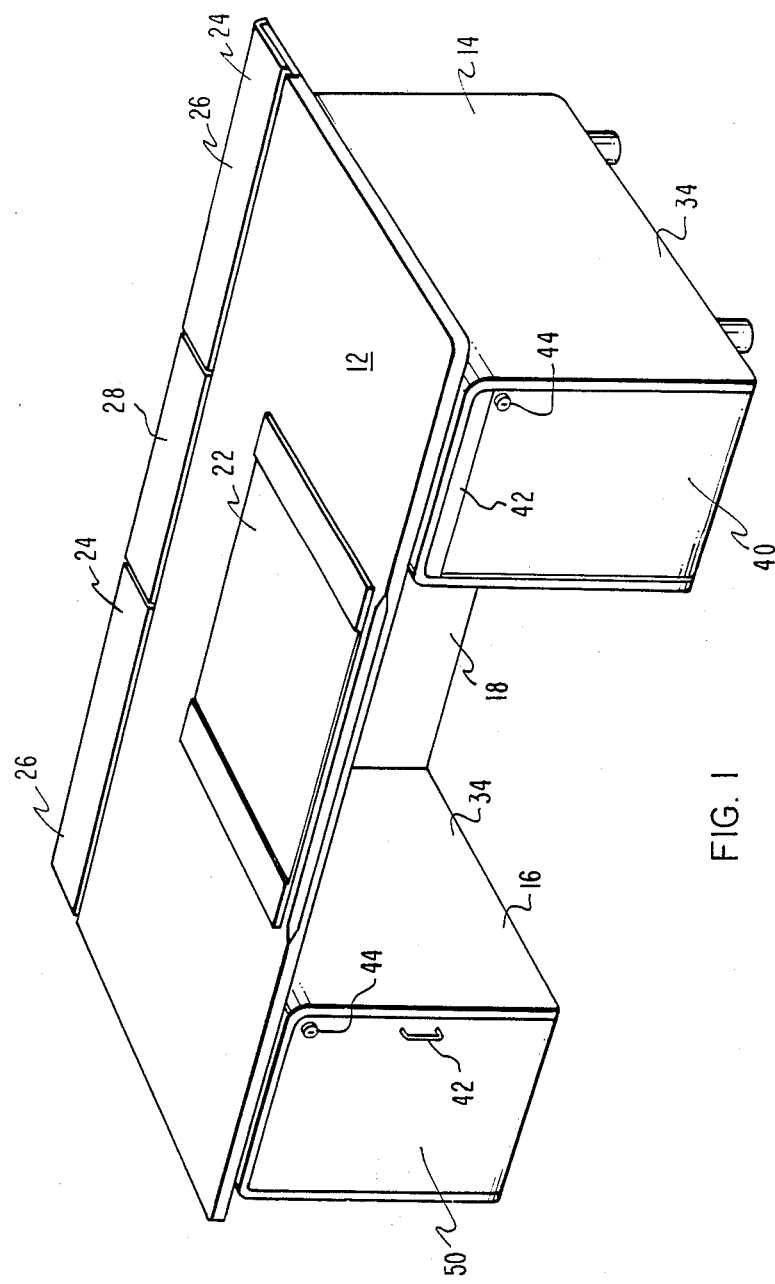
FIG. 1 is a perspective view of the computer-integrated desk of this invention in the closed mode.
Figure 6:
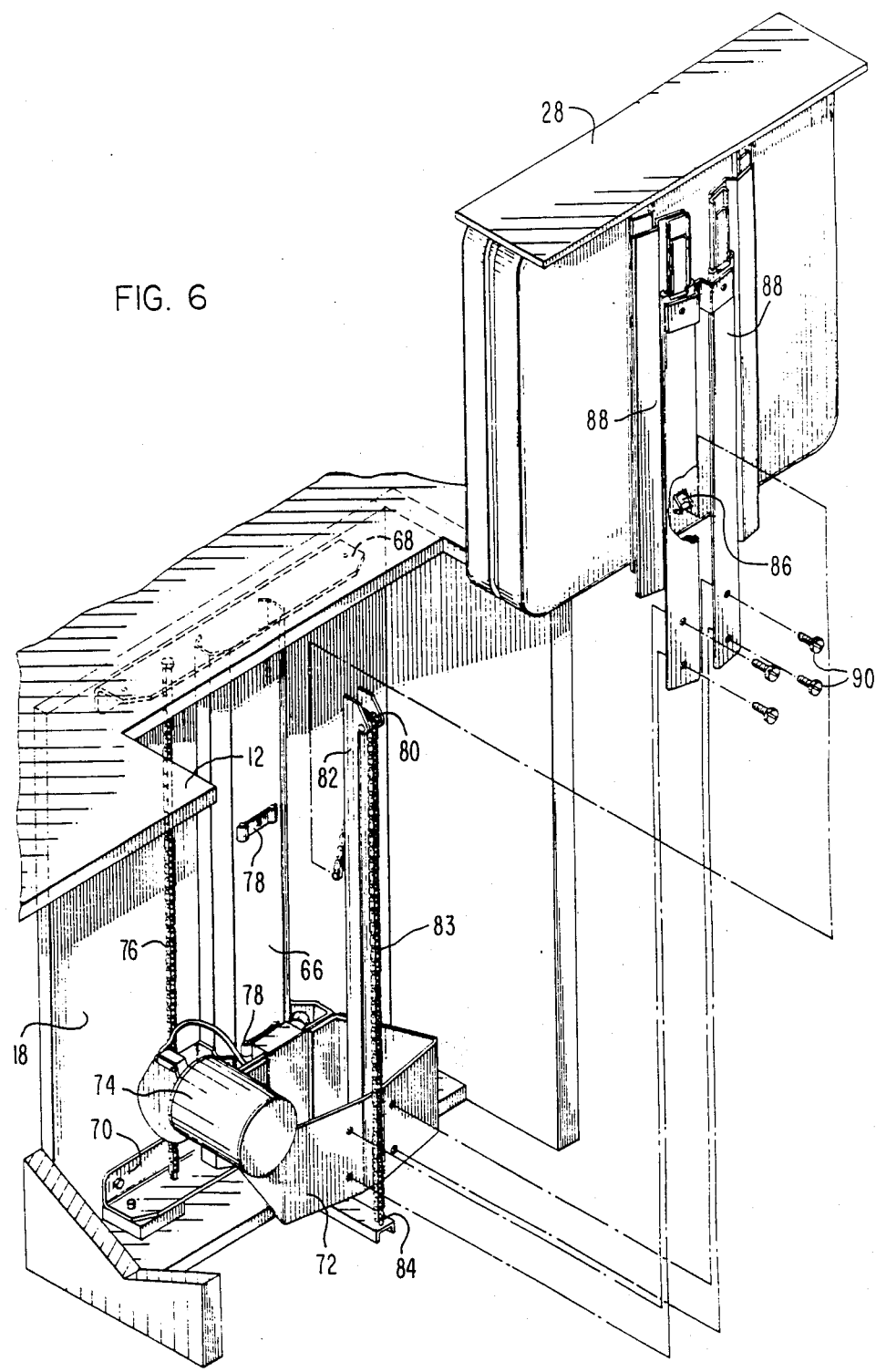
FIG. 6 is a perspective view of the flat screen VDT and lift mechanism.

Referring now in detail to the drawings wherein like reference characters represent like parts throughout the several views, there is illustrated in FIG. 1 the computer-integrated desk of this invention in its computer hidden mode wherein it provides the basic appearance of a conventional pedestal desk. It should be understood that the desk of this invention although illustrated as a dual pedestal free-standing desk, could be readily adapted to a wall hung desk for suspension from any of the many space dividing wall panel systems that are employed in the modern office. Equally, the desk could have a single pedestal and still function substantially as hereinafter described. The conventional appearing computer-integrated desk of this invention includes a planar work surface 12, a pair of work surface supporting storage pedestals 14 and 16, and a modesty panel 18. The work surface 12 has an extensive aperture 20 therein (FIG. 2) in the central forward area over the knee space between the pedestals 14 and 16. Overlying the aperture 20 is a desk pad 22 which completely eliminates the aperture and the keyboard mounted therein from view. At the rear edge of the work surface 12, a pair of flipper door covered accessory containers 24 are illustrated. The flipper-covered accessory holders are conventional on many desks and under the covers 26 are usually container spaces for paper clips, rubber bands, note paper and the like. The central rearward portion of the work surface includes a matching VDT cover 28 which serves to cover the upper edge of a flat screen VDT and provide a finish which matches the adjacent accessory covers 24. Where accessory containers are not provided at the rear edge of the desk, the entire rear edge can have the same finish as the work surface whether that surface be wood, wood grain, or other high-pressure laminate. FIG. 6 is illustrative of a work surface wherein the entire surface is of wooden or high-pressure laminate construction and the flat screen VDT cover 28 is fabricated of a similar material.

Figure 2:
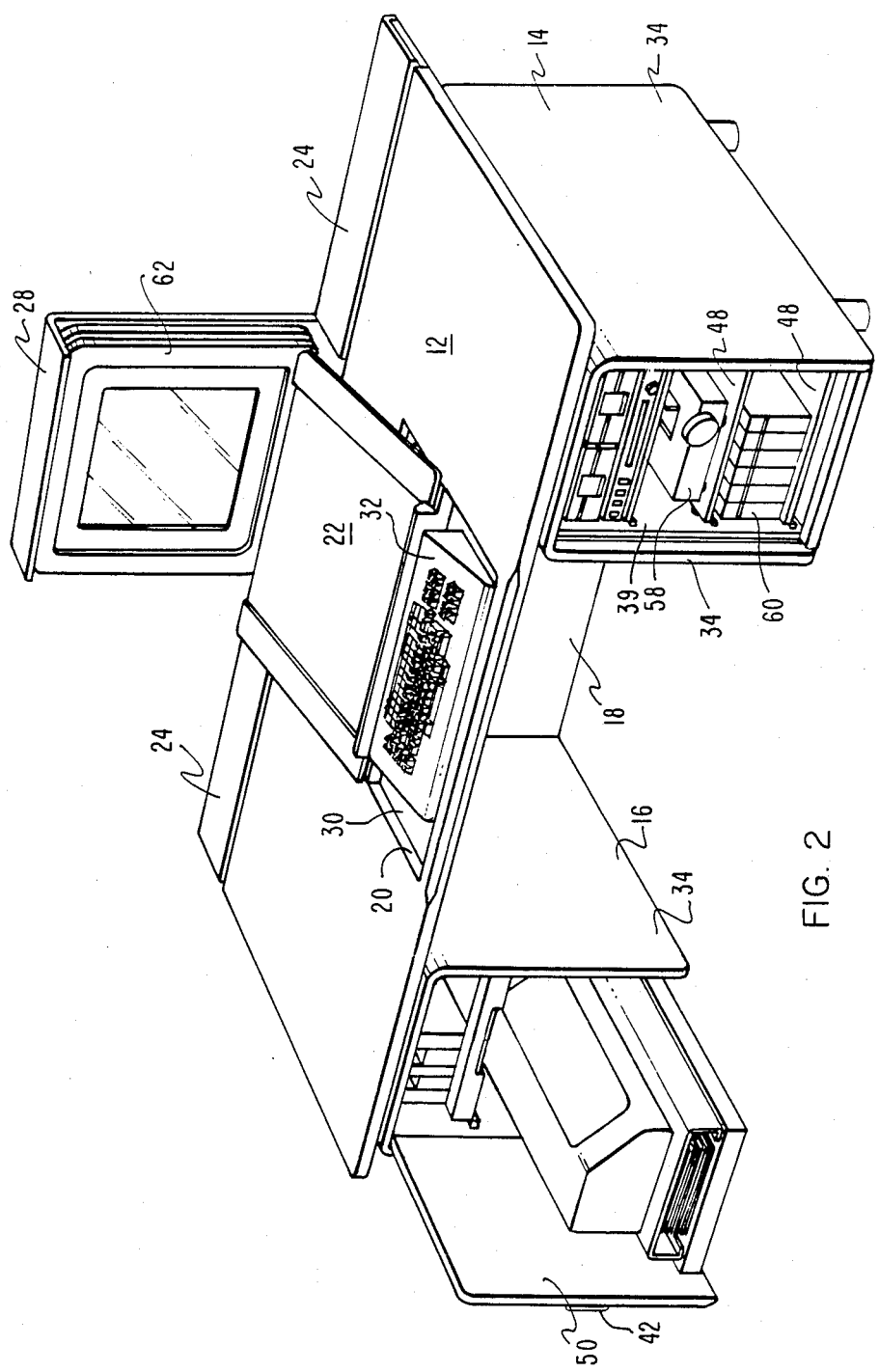
FIG. 2 is a perspective view similar to FIG. 1 with the desk in a computer access mode.
Figure 3:
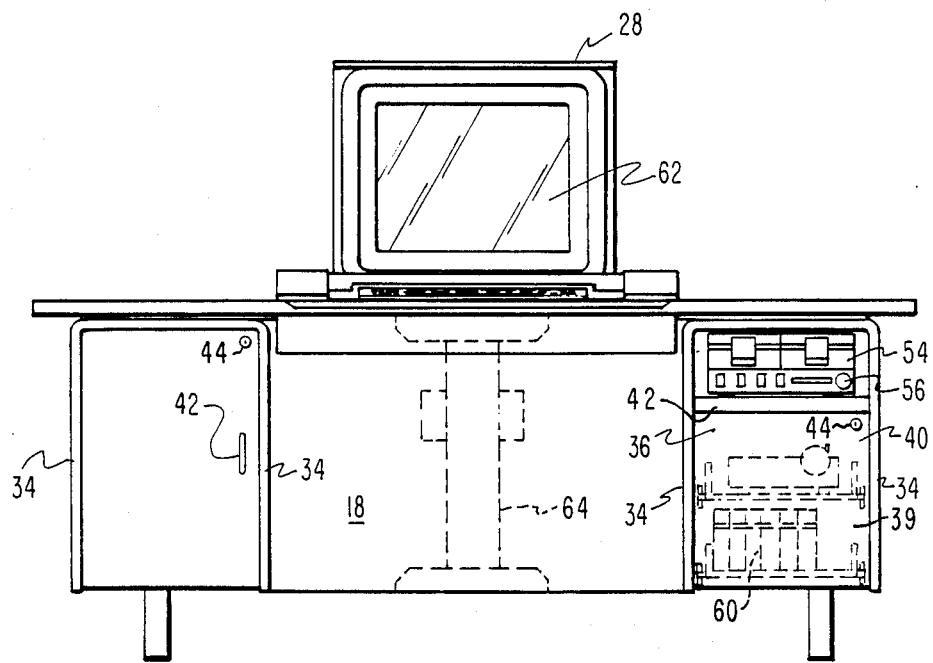
FIG. 3 is a front plan view of the desk in the computer access mode.
Figure 4:
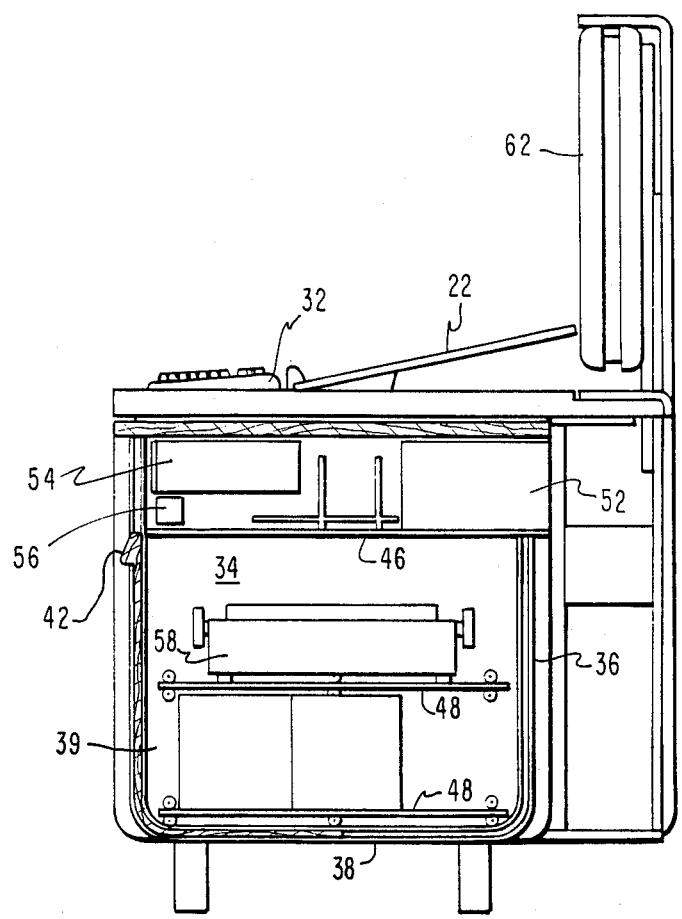
FIG. 4 is a side elevation view thereof with the desk side panel removed.
Figure 5:
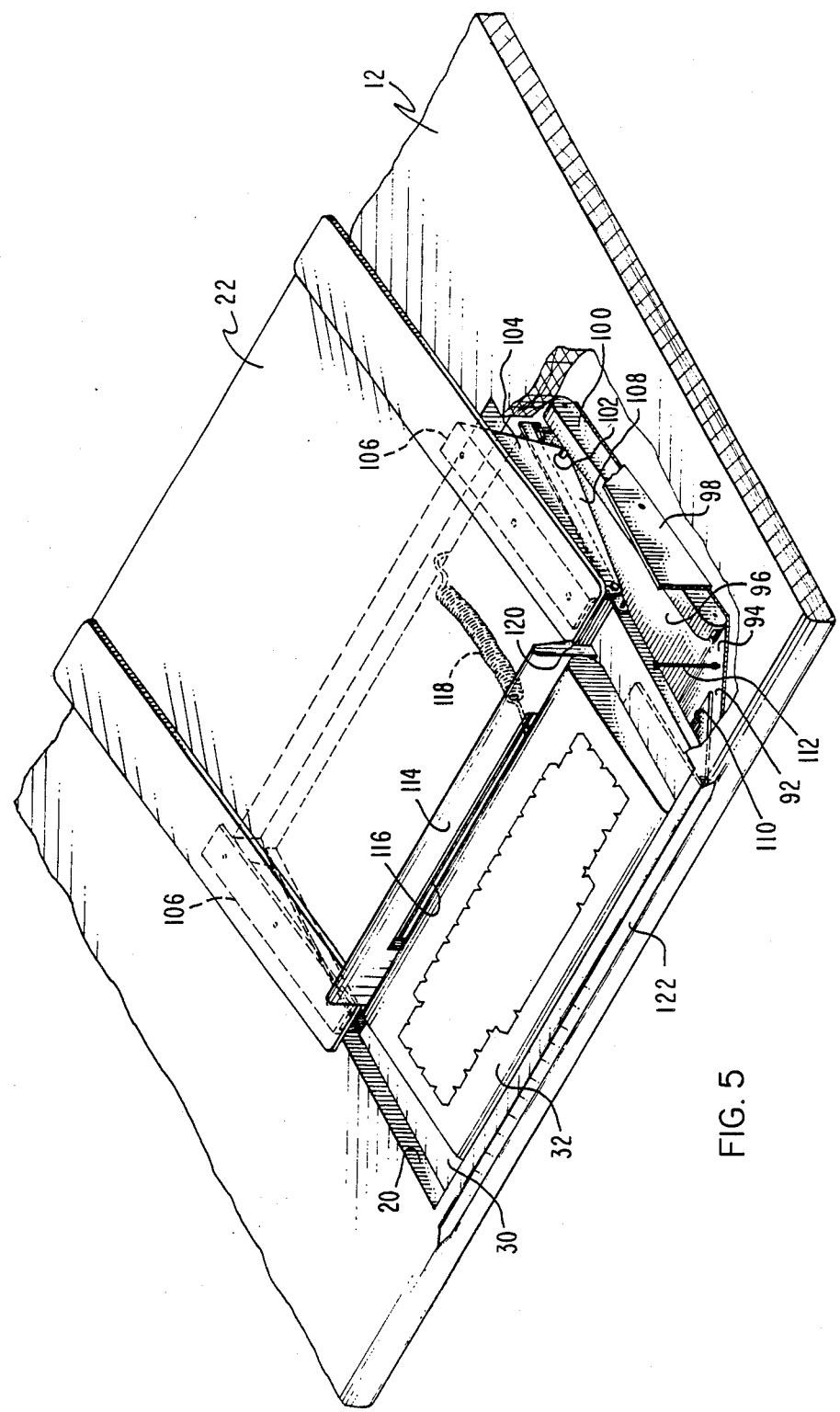
FIG. 5 is a perspective view of the keyboard mounting mechanism.

FIGS. 2, 3 and 4 illustrate the conversion of the conventionally-appearing desk of FIG. 1 into a computer work station. This conversion is accomplished by merely pushing forward the desk pad 22 which causes the mechanism supporting the keyboard support tray 30 to swing up into the aperture 20 thus raising a computer keyboard 32 situated thereon to an operating position. In its FIG. 2 position, the desk pad 22 now forms an easel for supporting work papers containing information to be entered into the computer. The pedestals 14 and 16 include side walls 34, a rear wall 36 and a bottom wall 38 defining a storage cavity 39 which is closed off by a tambour type door 40. The door 40 includes an operating depression or handle 42 therein and a lock 44. Supported within the storage cavity may be fixed shelves 46 or roll-out shelves, as for example, shelves 48, or any combination thereof. It should be noted that the lock 44 can be activated at various open stages of the tambour door 40 to provide security both totally closed or at any shelf level.

Although computer accessories can be mounted within the storage cavities in any convenient arrangement and alternatively to the tambour door 40, a hinged door 50 as illustrated on the left-hand pedestal can be employed, a preferred arrangement for the computer peripherals will be described. As illustrated in the right-hand pedestal of FIGS. 2, 3 and 4, a computer power supply 52 can be mounted at the rear of the top shelf. Preferably, forward of the power supply 52 is the computer disk drives 54 and a desk control panel 56 which can be wired to control turning on the computer, raising and lowering the flat-screened VDT and can even be wired to perform other functions such as turning lights in the room on and off or the operation of other miscellaneous accessories. The upper roll-out shelf 48 can support a small thermal printer 58. The lower slide-out shelf 48 can be fitted to accept common software products normally found associated with an office computer or computer terminal. As can be seen in FIG. 2, the left-hand pedestal 16 can be designed to accommodate a large printer and paper supply or can merely be used as a conventional storage file drawer or the like.

To complete the computer integrated desk, there is provided a flat screen VDT 62 which is operated by a lift mechanism 64 and is movable by that lift mechanism from the position shown in FIG. 1 by the VDT screen cover 28 to and from the position illustrated in FIG. 2. Although it should be understood that the lift mechanism could move a conventional box-like VDT from a storage area beneath the work surface to a viewable position above the work surface, modifications would be required to the central portion of the desk surface rearward of the normal rear edge. Such construction would, however, be prohibitive in providing a wall hung work surface incorporating the present invention. The new flat screen video display technologies which are now becoming available lend themselves more readily to integration within the computer desk disclosed herein.

The preferred lift mechanism, which is incorporated herein by reference, is described in detail in copending application Ser. No. 866,513 filed the same day as this application, entitled "Stow Away Flat Screen Mechanism" and owned by the assignee of this invention. Briefly, the lift mechanism is in part a conventional sewing machine lift mechanism marketed by Haefele Corporation of America, High Point, N.C., consisting of a vertically-mounted track 66 suspended between upper and lower mounting brackets 68 and 70, respectively. A traveler 72 propelled by a 24 volt DC motor 74 is mounted to the track 66 and the motor 74 engages a chain 76 mounted between the upper and lower mounting brackets 68 and 70 to cause the traveler 72 to move either up or down on the track 66. Magnetic limit switches are built into the traveler which sense small magnets 78 placed on the track to control the extent of travel of the traveler 72. Changes in travel distance are easily made by simply moving these magnets. Since the travel distance to raise or lower the VDT screen is 20 to 25 inches, a mechanism to move the screen would have to be between 24 to 29 inches in overall length. Space of this magnitude is normally unavailable under work surfaces set at a conventional height of about 19 to 20 inches. To accommodate the greater distances required for video screen travel, the sewing machine lift mechanism is modified by providing an idler 80 and idler support 82 attached to the traveler 72. Looped over the idler wheel is a chain 83, one end of which is fastened to a fixed point 84 on the lower end of the lift mechanism with the other end fastened to the lower edge of the flat screen VDT at 86. The result of this adaptation is that for every inch of travel movement of the traveler 72, the flat screen will move two inches thereby allowing the sewing machine lift to travel a much shorter distance and hence be able to fit beneath the work surface. To complete the mechanism, the flat screen is fitted with two conventional drawer glides, one end of which is fastened to the flat screen and the other end fastened to the traveler by means of bolts 90. These drawer glides control the motion and horizontally support the flat screen to provide smooth vertical motion to the flat screen as conveyed through chain 83 to the flat screen VDT. It should be understood that any kind of electrical mechanical or hydraulic lift mechanism capable of moving the flat VDT screen from a concealed position below the work surface to a viewable position above the work surface may be employed, and the lift mechanism disclosed herein simply describes a preferred lift mechanism embodiment which is described and claimed in the aforesaid copending patent application.

The pop-up keyboard tray and desk pad easel employed in connection with the computer-integrated desk of this invention is disclosed in detail in copending application Ser. No. 866,430, filed the same day as this application for Pop-Up Keyboard Tray and Desk Pad Easel, said application is owned by the assignee of this invention and is incorporated herein by reference. Briefly, the mechanism can be operated by light pressure and merely moving the desk pad 22 forward causes the keyboard support tray to pop up into the aperture or cut-out 20 in the desk or work surface 12. A shroud or housing 92 is situated beneath the aperture 20 in the work surface and includes a bottom having a rearwardly and downwardly sloping section 94 at the front and an upwardly and rearwardly sloping section 96 at the back. The housing 92 includes sidewalls 98 which include gear runners 100 secured thereto which includes a gear rack on the upper interior surface which coacts with a pinion gear which is rotatably mounted by the axle 102 on each of the desk pad support members 104. The desk pad support members include flanges 106 which are secured to the underside of the desk pad 22. Extending at right angles from the flanges 106 is a quadralaterally-shaped body portion having the axle 102 pivotally mounted in the furthest corner from the flange 106.

As the desk pad is moved up and away from the desk aperture 20 by the rack and pinion camming action, a leaf spring 110 acting between the housing 92 and the underside of the keyboard support tray 30 causes the keyboard support tray to swing to a horizontal position which is controlled by the cord member 112 also interconnecting the housing 92 and the keyboard support tray 30. Extending vertically at right angles to the keyboard support tray 30 is a locking bar 114 which includes a slot 116 therein to permit a power cable 118 to connect to the computer keyboard 32. The locking bar 114 also includes an undercut lip 120 which serves to lock the keyboard support tray 30 in a horizontal position when the front edge of the desk pad is moved rearwardly slightly to interlock with the lip 120. To return the keyboard to its concealed position, the desk pad is moved slightly forward allowing the lip 120 of a locking bar to disengage from the front edge of the keyboard tray, the keyboard tray is then depressed so that the locking bar moves beneath the level of the front edge of the desk pad 22 and the desk pad 22 is then simply moved to its normal position and the camming action of the pinion gear moving in the gear runner 110 toward the front of the desk will move the keyboard pad to its normal position overlying the keyboard and the aperture 20. A beveled edge 122 can be provided in the front edge of the desk adjacent the aperture 20 to provide a comfortable hand rest for the keyboard operator.

As will be apparent from the foregoing, the computer-integrated desk of the present invention is convertible from a conventionally-appearing office desk to a fully operable, convenient and efficient computer work station with minimal time and effort and represents a significant advance in office aesthetics in the modern computer environment.

What is claimed is:

1. A computer work station or desk comprising, in combination:
   a work surface having an opening therethrough adjacent the front edge thereof;
   storage means connected to the underside of said work surface adjacent at least one side thereof;
   a desk pad covering said opening in said work surface and a keyboard tray mounted within said opening beneath said desk pad;
   means cooperating with said desk pad to raise said keyboard tray to an operating position within said opening in response to said desk pad being moved from a first position overlying said opening to a second position rearward of said opening,
   a flat VDT screen mounted to the rear of said work surface for relative movement therewith; and
   motorized elevating means associated with said VDT screen for moving said VDT screen from a position beneath said work surface to a viewable position above said work surface.

2. A computer work station or desk according to claim 1 wherein said storage means includes a rear wall and side walls and a door closing off the front thereof, said side walls supporting movable shelf means thereon.

3. The computer work station or desk according to claim 2 wherein said door is a tambour door and a computer disc drive and printer are situated within said storage means behind said door.

4. A computer work station or desk according to claim 1 wherein said motorized elevating means includes position stop means thereon.

* * * * *